UNITED STATES PATENT OFFICE.

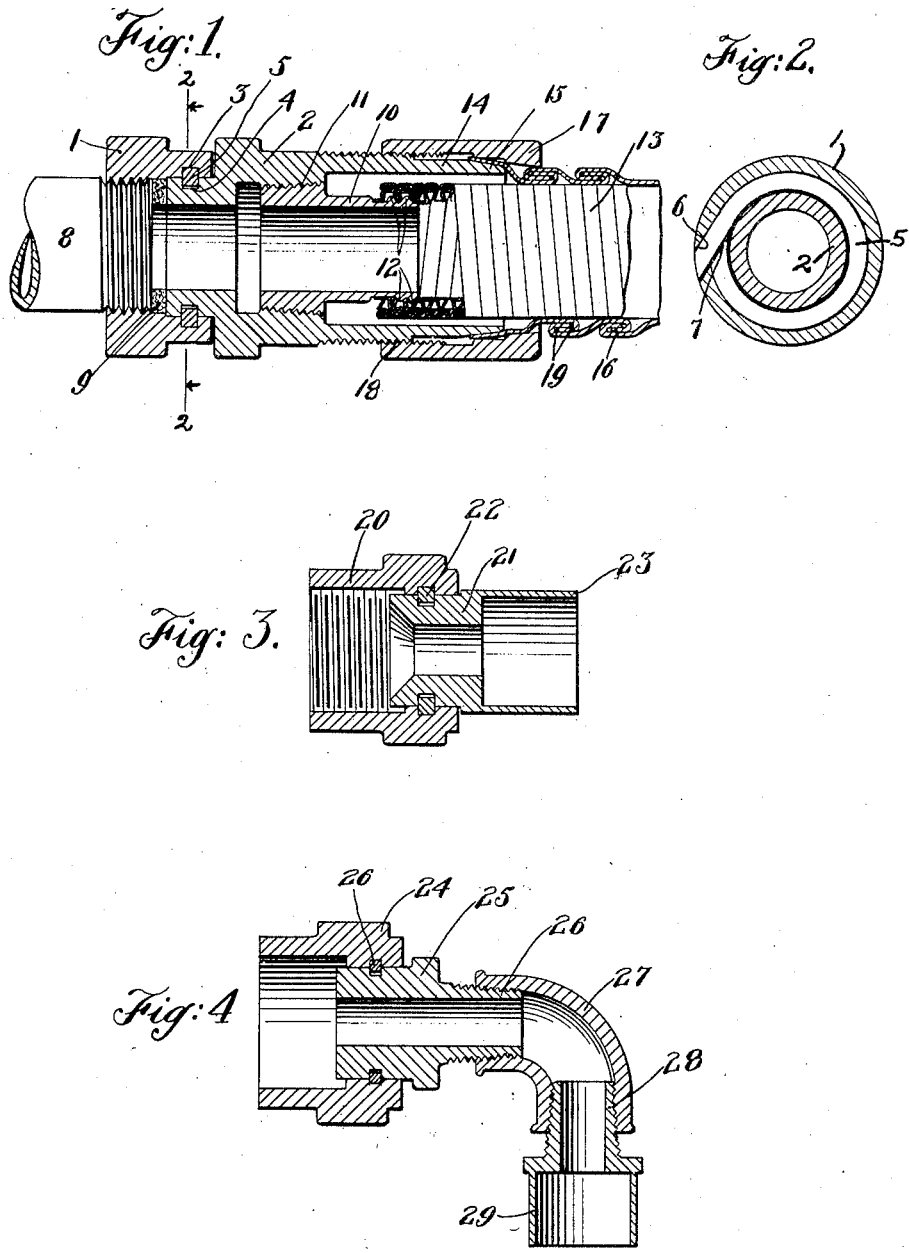

WILLIAM H. FULTON, OF IRVINGTON, NEW JERSEY, ASSIGNOR TO TITEFLEX METAL HOSE CORPORATION, A CORPORATION OF NEW YORK.

SWIVELED PIPE-UNION.

1,329,760.　　　　　Specification of Letters Patent.　　Patented Feb. 3, 1920.

Application filed February 20, 1918. Serial No. 218,208.

*To all whom it may concern:*

Be it known that I, WILLIAM H. FULTON, a citizen of the United States, residing at Irvington, Union county, State of New Jersey, have invented new and useful Improvements in Swiveled Pipe-Unions, of which the following is a specification.

The present invention relates to a structure for uniting pipes in such manner that they may turn or swivel with respect to each other.

Certain pipes or hose which are formed from a helically disposed strip of material and have the edges of adjacent convolutions interfolded, are most likely to be damaged by a twisting action, which, under some circumstances, may cause a sliding of the interfolded parts and a deterioration of the joint. It is therefore desirable in uniting such hose or pipe to another portion, to provide swiveling means so that the pipe or tube may turn with relation to the member with which it is connected whenever any torsion is placed upon it and so avoid the exertion of any considerable torsional force tending to distort the tube. In order that this result may be accomplished, it is necessary that the swivel joint should be made so that it will swivel under the application of a small amount of force and further that it should be reliable in operation—that is to say, it may be depended upon to always turn upon the application of a small amount of force and will not stick or be irregular in its operation, and further is not subject to rapid deterioration or wear whereby its uniformity and ease of operation will be interfered with and damage caused to the tube by reason of the sticking of the swivel or excessive force required for its operation.

The invention relates to that type of swivel joint wherein two telescoping members have registering circumferential grooves forming an annular chamber in which a key is placed, this key locking the members of the union against longitudinal displacement, but permitting them to relatively turn. Casting the key into the chamber is objectionable for the reason that the cast metal may be poured in whether or not the grooves are in proper registry and so may produce an imperfect working joint. In any event, the metal of the key will press equally against both of the tubular members so that the force necessary to turn is increased. Also the cast metal will interlock with any roughness or irregularity in the chamber so as to increase the difficulty of turning. If a key or chamber of circular cross-section is employed, a wedging action exists between the key and the walls of the key chamber, tending to cause the members of the joint to ride upon the key and be wedged together thereby, if a sidewise pull is exerted upon the pipe, thereby wedging the members together and removing the ease of turning, if not entirely preventing it. This action is prevented by making the sides of the grooves and the adjacent sides of the key squarely abutting so that no wedging action can take place such as is the case when a key of round section is contained in a chamber of similar section. In that type of joint wherein the inner member of the telescoping pair is provided with a groove into which a spring key is placed prior to its insertion into the outer telescoping member, the key after such insertion, springing out into a registering groove in the last mentioned member, the key does not substantially fill the chamber and consequently does not firmly hold the parts in proper operative position so that they may be easily turned and moreover the spring of the washer may cause it to press against both of the members, thereby increasing the friction between them and preventing their easy relative turning. Also the groove on the inner member must be so deep as to permit the key to be depressed into it so as to clear the outer member. This is necessary to permit assembling and a corresponding depression which might occur because of a wedging action on the key when the members are subjected to longitudinal pull, would permit the joint to come apart in service.

If the key is of sufficient stiffness to be driven endwise into the chamber by blows on its end, it will be of sufficient resilience so that, as it is driven in, it will be deflected about the joint by the outer wall of the chamber and will hug thereto, so that pressure upon the inner member will be prevented and the key will form substantially a flange upon the outer joint member, which extends into the groove of the inner member, occupying the latter with a running fit. Friction between the parts is thereby prevented, while they are firmly held in proper operating position. If attempt were made to use a soft annealed wire for the key, aside from the special provisions which would have to be made as contrasted with the simple process of driving in the key blank like a nail with a hammer in order to force the wire into the key chamber of the joint, the wire might pack in the chamber and not being possessed of sufficient resiliency to cause it to hug the outer joint member, might bear against both members and so increase the friction in the joint which it is so desirable to avoid.

The objects of the invention are to avoid the disadvantages and realize the advantages as above indicated.

Other and ancillary objects of the invention will appear hereinafter.

In the accompanying drawings which illustrate the invention.

Figure 1 is a longitudinal section of a coupling embodying the invention;

Fig. 2 is a section on the line 2—2 of Fig. 1;

Fig. 3 is a longitudinal section of a modified joint; and—

Fig. 4 is a modification showing an elbow connection.

Referring to the drawings and first to Figs. 1 and 2, the joint comprises an outer telescoping member 1 and an inner telescoping member 2 having respectively the circumferential grooves 3 and 4 which, when in registry, form an annular chamber for receiving the key 5 of rectangular cross-section. The cross-section of this key substantially fills the cross-section of the chamber, there being only a running clearance between the key and the wall of the chamber. The key blank is entered endwise into the chamber through a hole 6 in the outer member 1 of the tubular telescoping members—this hole permitting the key blank to be inserted in the opening with its axis substantially tangent to the axis of the key chamber as shown in Fig. 2. The key blank is of such stiffness that it may be driven endwise through the hole 6 into the key chamber by blows upon its outer end after the manner of driving a nail, it being of sufficient stiffness to permit this to be done without buckling. As the key blank is driven into the chamber, it is deflected about the joint by the outer wall of the chamber and is possessed of sufficient resilience so that it hugs this wall of the chamber and does not press upon the inner member 2, so that the key forms substantially a flange upon the outer member having a running clearance in the groove of the inner one of the telescoping members. A steel key blank may be advantageously used as possessing the requisite stiffness and resilience as above referred to. The forward end 7 is inclined to the axis of the key so as to fit in to the space between the tail end of the key and the walls of the key chamber, as shown in Fig. 2, thereby substantially filling the key chamber and contributing to the uniformity and smoothness of operation of the joint. Within the member 1 may be screwed the end of a pipe 8, a packing washer 9 being inserted between the end of this pipe and the member 2 to prevent leakage.

The member 2 comprises a projection 10 which is secured to that member by a screw threaded connection 11. The projection 10 may be provided with threads 12 which engage with the spiral grooves in a corrugated flexible tube 13 which may be formed of a flexible strip having the edges of the helical convolutions interfolded and having a groove longitudinally of the strip to provide flexibility. This corrugated tube may be screwed upon the threads 12 as shown. To render the joint more secure, the joint may be soldered or fastened in other ways.

Surrounding the projection 10 is a shell 14 having a tapered surface 15 over which may be telescoped the end of an armor 16 for the tube 13, the end of the armor being clamped against the shell 14 by means of a clamping sleeve 17 which is screw-threaded at 18 upon the shell 14. The armor referred to may be of the structure shown, that is formed of a helically disposed strip with the edges of adjacent convolutions interlocked; instead however, of flexibility being provided in the armor by means of corrugations as in the tubes 13, such flexibility is permitted by clearances 19 in the interlocked joints.

Referring now to Fig. 3, the outer telescoping member 20 and the inner telescoping member 21 are secured together by means of a key 22 arranged as described in connection with the key 5 as in Figs. 1 and 2. The member 20 is internally screw-threaded as shown to receive the end of a pipe while the member 21 is provided with a tubular shell 23 to which a pipe may be secured in any desired manner.

Referring to Fig. 4, the outer telescoping member 24 and the inner telescoping member 25 are swiveled together by means of a key 26 as was described in connection with the key 5 in Figs. 1 and 2. The member 25 is provided with a nipple 26 adapted to be screwed into one end of an elbow 27, the other end of the elbow receiving a nipple 28 secured to a pipe 29.

While the invention has been illustrated in what are considered its best applications, it may have other embodiments without departing from its spirit, and is not therefore, limited to the structures shown in the drawings.

What I claim is—

1. In a swiveled pipe coupling, the combination with telescoping tubular members having registering circumferential grooves forming an annular chamber of substantially rectangular cross-section, and one of said members having a hole for admitting a key blank, of a key of substantially rectangular cross-section and substantially filling said chamber, said key being of a stiffness that it may be driven through said hole into said chamber by blows on its end, said key being larger in cross-section than either of said grooves.

2. In a swiveled pipe coupling, the combination with telescoping tubular members having registering circumferential grooves forming an annular chamber of substantially rectangular cross-section, and one of said members having a hole for admitting a key blank, of a key of substantially rectangular cross-section and substantially filling said chamber, said key being of a resiliency to hug the outer wall of the chamber when forced therein, preventing pressure of the key on the inner wall of the chamber, said key being larger in cross-section than either of said grooves.

3. In a swiveled pipe coupling, the combination with telescoping tubular members having registering circumferential grooves forming an annular chamber of substantially rectangular cross-section, and one of said members having a hole for admitting a key blank, of a key of substantially rectangular cross-section and substantially filling said chamber, said key being of a stiffness that it may be driven through said hole into said chamber by blows on its end, and of a resiliency to hug the outer wall of the chamber when forced therein, preventing pressure of the key on the inner wall of the chamber, said key being larger in cross-section than either of said grooves.

4. In a swiveled pipe coupling, the combination with telescoping tubular members having registering circumferential grooves forming an annular chamber of substantially rectangular cross-section and one of said members having a hole for admitting a key blank to said chamber, of a key substantially rectangular in cross-section in said chamber, the forward end of said key having a surface inclined to the key axis.

5. In a swiveled pipe coupling, the combination with telescoping tubular members having registering circumferential grooves forming an annular chamber of substantially rectangular cross-section and one of said members having a hole for admitting a key blank to said chamber, said hole permitting the insertion of the key blank with its axis substantially tangential to the axis of said chamber, of a key of substantially rectangular cross-section and substantially filling said chamber, said key being of a stiffness such that it may be driven through said hole into said chamber by blows on its end, and of a resiliency to hug the outer wall of the chamber when forced therein, thereby preventing pressure of the key on the inner wall of the chamber, and the forward end of said key having a surface inclined to the key axis.

In testimony whereof I have signed this specification this 15th day of February, 1918.

WILLIAM H. FULTON.